United States Patent [19]

Mitchell

[11] 3,901,327
[45] Aug. 26, 1975

[54] APPARATUS FOR SUPPORTING FARM IMPLEMENTS FOR WORKING AND TOWING
[75] Inventor: James L. Mitchell, Meridian, Miss.
[73] Assignee: Midland Manufacturing Company, Inc., Electric Mills, Miss.
[22] Filed: Mar. 25, 1974
[21] Appl. No.: 454,561

[52] U.S. Cl. ............... 172/413; 172/456; 172/625
[51] Int. Cl.² ........................................ A01B 63/22
[58] Field of Search .......... 172/456, 625, 248, 310, 172/311, 322, 323, 423, 413, 44; 280/412, 411

[56] References Cited
UNITED STATES PATENTS
| | | | |
|---|---|---|---|
| 2,696,772 | 12/1954 | Underdown | 172/625 X |
| 2,900,031 | 8/1959 | Sorensen et al. | 172/44 |
| 3,240,005 | 3/1966 | Rowse | 172/625 X |
| 3,288,480 | 11/1966 | Calkins et al. | 172/44 X |
| 3,460,631 | 8/1969 | Friesen et al. | 172/311 |
| 3,487,882 | 1/1970 | Burton | 172/413 X |
| 3,525,537 | 8/1970 | Honnold | 172/625 X |

Primary Examiner—Stephen C. Pellegrino
Attorney, Agent, or Firm—Woodford R. Thompson, Jr.

[57] ABSTRACT

An elongated frame supports farm implements in a working position with the longer dimension of the frame extending transverse to the direction of travel. An elongated rock shaft is mounted on the elongated frame for transverse pivotal movement in a vertical plane. Depending caster wheel units are mounted adjacent each end of the rock shaft for lateral pivotal movement. The rock shaft is held at selected pivoted positions to vary the elevation at which the frame and the implements carried thereby are supported. A stabilizer spaced laterally from the wheel units engages the ground as the frame is towed lengthwise by a towing tongue operatively connected to one end of the frame. Lateral oscillation of each wheel unit is limited by a releasable lock between the wheel unit and the rock shaft.

11 Claims, 7 Drawing Figures

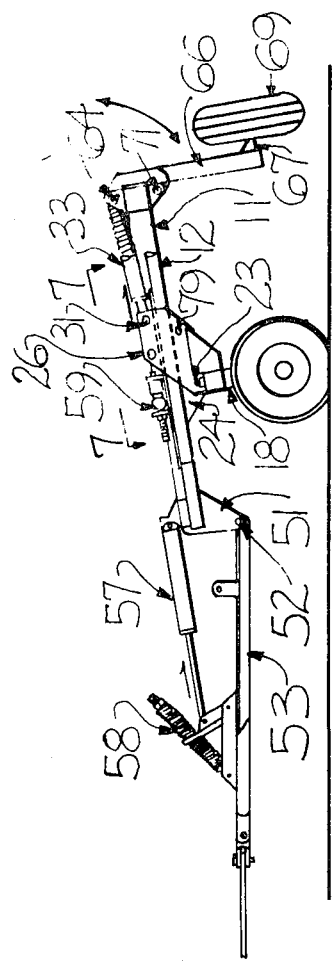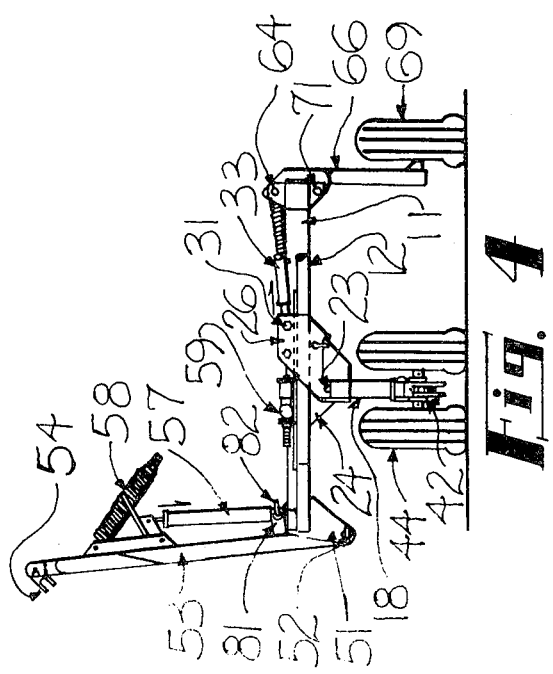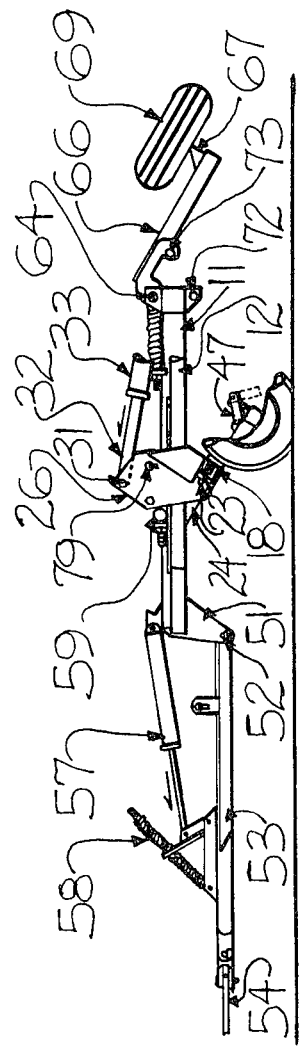

3,901,327

APPARATUS FOR SUPPORTING FARM IMPLEMENTS FOR WORKING AND TOWING

BACKGROUND OF THE INVENTION

This invention relates to apparatus for supporting farm implements for working and towing and more particularly to apparatus for supporting an elongated frame and the implements carried thereby in a working position with the longer dimension of the frame extending transverse to the direction of travel for working. During towing, the longer dimension of the elongated frame extends in the direction of travel.

Heretofore in the art to which my invention relates, difficulties have been encountered in transporting elongated frames which support farm implements in a working position with the longer dimension of the frame extending transverse to the direction of travel due to the fact that such apparatus is too wide for towing. That is, it is very desirable to reduce the width of the apparatus to a minimum as it is being towed from place to place. Many wide frames for supporting farm implements rely on hydraulically or manually foldable sections or elements to achieve a transport width somewhat narrower than the operating or working width. This has been unsatisfactory due to the fact that the upwardly folded sections project to dangerous heights above the road. Also, some tool supporting frames are split into narrow sections for trailing while others rely on separate transport wheel units that serve only for towing. Furthermore, some wide implement supporting frames employ a plurality of caster wheels with a king pin axis that remains vertical at all times. With such apparatus, it is necessary to provide complicated means for varying the elevation of the implements relative to the supporting frame.

BRIEF SUMMARY OF THE INVENTION

In accordance with my invention, I provide an elongated frame for supporting farm implements selectively in a working position and in a towing position. While in the working position, the longer dimension of the frame extends transverse to the direction of travel and while in the towing position, the longer dimension extends in the direction of travel. The frame is supported by at least one longitudinally extending rock shaft which carries depending wheel units whereby upon rotation of the rock shaft to selected angular positions, the elevation of the elongated frame and the implements carried thereby is varied. Accordingly, the depth of operation of the implements may be readily adjusted. A stabilizer spaced laterally from the wheel units engages the ground as the frame is towed lengthwise by a towing tongue operatively connected to one end of the frame. A transversely extending working tongue is connected to the elongated frame for drawing the same in the working direction and is movable selectively from a horizontal operative position to an upstanding inoperative position to reduce the overall width of the frame during towing.

DESCRIPTION OF THE DRAWINGS

Apparatus embodying features of my invention is illustrated in the accompanying drawings, forming a part of this application, in which:

FIG. 2 is an end elevational view, partly broken away, taken generally along the line 2—2 of FIG. 1, the towing tongue and the farm implements being omitted for the sake of clarity;

FIG. 3 is an end elevational view corresponding to FIG. 2, showing an intermediate position between the working position and the towing position;

FIG. 4 is an end elevational view, corresponding to FIG. 2, showing the apparatus in towing or transport position;

Referring now to the drawings for a better understanding of my invention, I show an elongated supporting frame 10 which may comprise one or more frame sections. I show the frame 10 as having a centrally disposed main frame 11 and wing frames 12. The wing frames 12 are pivotally connected to the main frame by suitable hinge units 13 whereby the frames 11 and 12 are adapted to move relative to each other to accommodate the elongated frame 10 to the contour of the ground over which the apparatus passes. In FIG. 1 of the drawing I show the farm implements carried by the elongated frame 10 as being disc harrows 14 having a plurality of spaced apart disc blades 16. In view of the fact that a disc harrow is a conventional type farm implement, no further description thereof is deemed necessary. Also, while I show the farm implement carried by the elongated frame 10 as being a disc harrow, it will be apparent that the implement could be in other forms, such as a cultivator, grain drill and the like.

Extending longitudinally of each end portion of the elongated frame 10 and pivotally connected to each wing frame 12 is an elongated rock shaft 18 which comprises a horizontally extending base portion 19 connected to depending leg portions 21, as shown in FIGS. 1 and 5. Secured to and projecting upwardly from each rock shaft 18 adjacent the inner portion thereof is a pair of support brackets 22 which are pivotally connected by a pivot pin 23 to a depending support bracket 24 carried by each wing frame 12. Secured to and projecting upwardly from the rock shaft 18, in spaced relation to the upstanding brackets 22 are upstanding brackets 26 which are pivotally connected by a pin 27 to a depending support bracket 24 carried by the wing frame 12. The pivot pins 23 and 27 pass through suitable openings 28 and 29 provided through the brackets 22 and 26, respectively. As shown in FIGS. 2–4, the brackets 26 extend upwardly beyond the wing frame 12 and the upper ends thereof are pivotally connected by a pivot pin 31 to the piston rod 32 of a fluid pressure operated cylinder 33. The cylinder 33 is pivotally connected to the wing frame 12 by a pivot pin 34. Accordingly, upon movement of the piston rod 32, the brackets 26 and the rock shaft connected thereto are moved to selected angular positions relative to the wing frame 12. That is, the rock shaft is adapted for pivotal movement in a vertical plane extending transversely of the elongated frame 10.

Secured to the lower end of each leg member 21, such as by welding at 36, is a depending tubular member 37 which receives the upper end of a shaft-like member 38 which may be in the form of a king pin. The upper end of the shaft-like member 38 is secured to the tubular member 37 by a suitable securing bolt 39. Mounted for rotation on the shaft-like member 38 beneath the tubular member 37 is a trunnion member 41 which carries spaced apart, rearwardly extending projections 42, as shown in FIGS. 5 and 6. Extending through and projecting laterally from the projections 42 are spindles 43 which support wheels 44, as clearly shown in FIG. 4. As shown in FIG. 6, the center line of the spindles 43 are located rearwardly of the shaft-like member 38 so that the wheel unit casters to selected trail positions.

Figure 5:
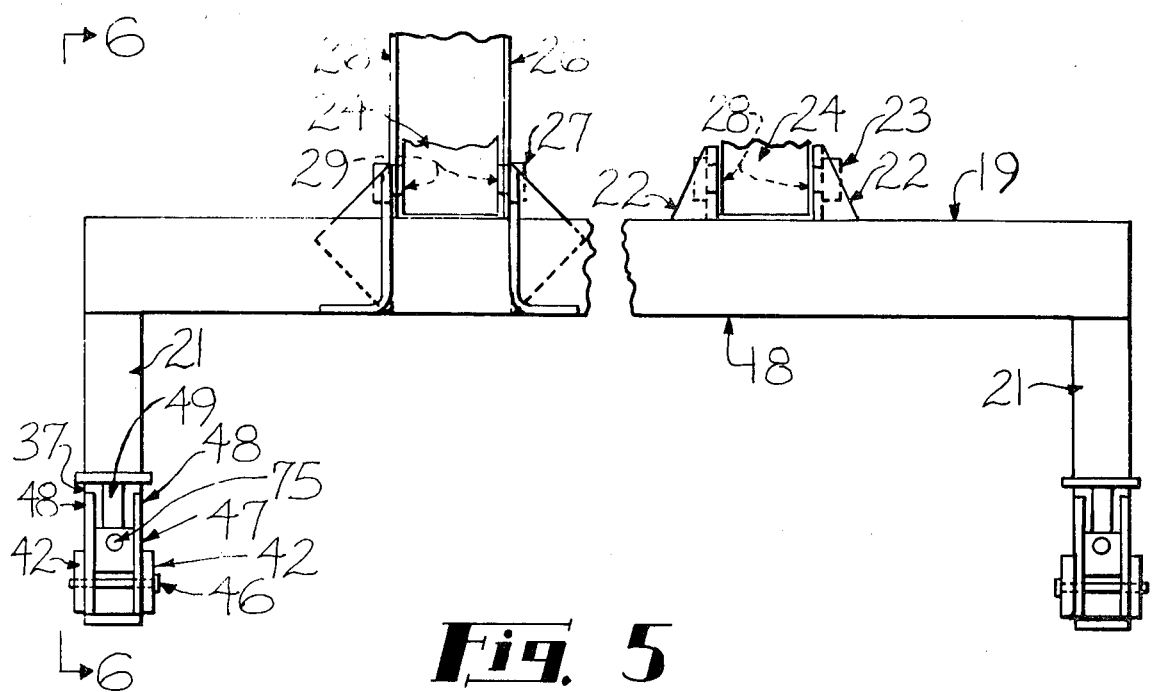
FIG. 5 is an enlarged view, partly broken away, taken generally along the line 5—5 of FIG. 1 showing the rock shaft removed from the remainder of the apparatus.
Figure 6:
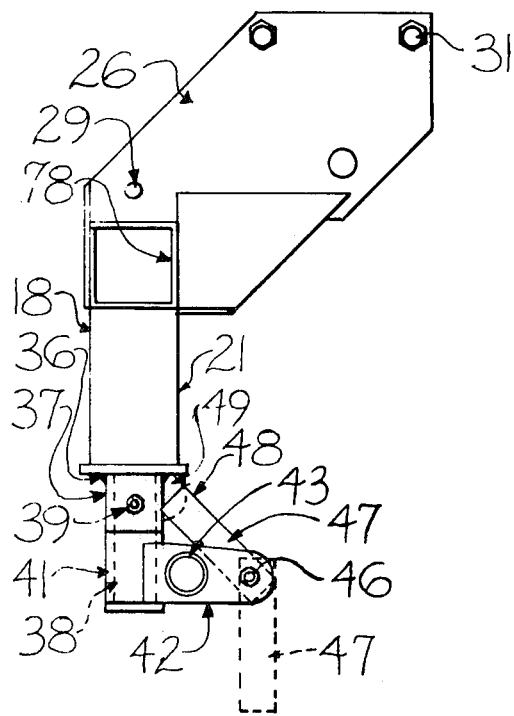
FIG. 6 is an elevational view taken generally along the line 6—6 of FIG. 5; and, FIG. 7 is an enlarged, fragmental view taken generally along the line 7—7 of FIG. 3.

Extending between and pivotally connected to the outer ends of the projections 42, by a pivot pin 46 is an elongated connector member 47 having spaced apart extensions 48 adjacent the free end thereof, as shown in FIG. 5. A lateral projection 49 is secured to the tubular member 37, as shown in FIGS. 5 and 6, which is positioned between the extensions 48 upon pivotal movement of the bracket 47 to the position shown in FIG. 6. The bracket 47 thus provides a releasable lock member which is interposed between the trunnion member 41 and the lateral projection 49 to limit lateral oscillation of the wheel unit. Preferably, the projection 49 is spaced from the adjacent extensions 48 a distance to permit the wheels 44 to oscillate plus or minus 10° to provide load equalization and improved flotation as the apparatus passes over the ground. The rock shaft 18 can rotate relative to the wing frame 12 an angular distance of approximately 60° whereby the implements 14 may be lifted clear of the ground or may be lowered to a position whereby the implements are in full engagement with the ground with the wheels clear of the ground. Also, intermediate positions for depth control may be provided by moving the rock shaft 18 to selected angular positions.

As shown in FIGS. 1–4, support brackets 51 project downwardly and forwardly of the central portion of the main frame 11. Pivotally connected to the support brackets 51 by suitable hinge pins 52 is one end of a working tongue 53 which projects laterally from the front side of the main frame 11 for drawing the elongated frame 10 in the direction for working. The free end of the working tongue 53 is provided with a suitable hitch 54 for detachably connecting the working tongue to a tractor 56. The working tongue 53 is moved selectively from the horizontal, working position shown in FIGS. 2 and 3 to an upstanding, inoperative position, as shown in FIG. 4, by a fluid pressure operated cylinder 57. The cylinder 57 also positions the tongue 53 to drawbar height for hitch-up to the tractor 56 and is employed to tilt the elongated frame 10 during change from field operation or working position to the transport or towing position. Also, the cylinder 57 is used during operation of the apparatus to control the vertical load on the front or rear working implements carried by the frame. A spring loaded lever 58 is provided on the tongue 53 to permit the necessary spring cushioned flexibility of the tongue. In view of the fact that such spring loaded levers are conventional units, no further description thereof is deemed necessary.

Figure 7:
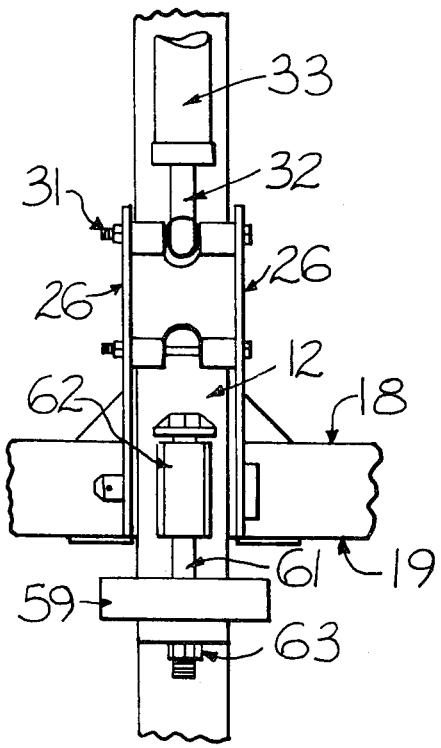

Depth control of the working implements 14 is controlled by moving the rock shaft to selected angular positions transversely of the elongated frame 10. To limit the depth, I provide a control stop member 59 which is positioned in front of the brackets 26 carried by the rock shaft 18. The stop member 59 is carried by an elongated threaded rod 61 which passes through a sleeve-like member 62 carried by the wing frame 12, as shown in FIG. 7. A retaining nut 63 engages the threaded portion of the rod 61 to vary the effective length of the rod 61 and thereby position the stop member 59 at selected positions. Accordingly, in the working position shown in FIG. 2, the brackets 26 are in engagement with the stop member 59 to limit the depth at which the ground engaging implements operate.

Pivotally connected to the central portion of the main frame 11 by means of a hinge pin 64 is a depending stabilizer frame 66. The lower end of the frame 66 carries a spindle 67 which supports a wheel 69. As shown in FIGS. 2–4, the wheel 69 is adapted to move selectively to a ground engaging position and to a position out of engagement with the ground. To lock the stabilizer frame 66 in the vertical position, shown in FIG. 4, a bolt 71 passes through openings 72 and 73 provided in the main frame 11 and the stabilizer frame 66, respectively. Accordingly, while the apparatus is being towed, the stabilizer frame is locked in position by the bolt 71.

When it is desired to tow the apparatus, a towing tongue 74 is connected to the connector bracket 47 carried by a wheel unit adjacent one end of the elongated frame 10. That is, the connector bracket 47 to be connected to the towing tongue 74 is pivoted from the position shown in FIG. 6 to a horizontal position. A suitable opening 75 is provided in the connector bracket 47 for receiving a pin 76 whereby the towing tongue 74 is attached to the wheel unit. A suitable hitch element 77 is provided at the free end of the towing tongue 74 for attaching the tongue to a tractor whereby the elongated frame 10 is conveyed lengthwise. When not in use, the towing tongue 74 is stored within the adjacent rock shaft 18. That is, the rock shaft 18 may be hollow, as shown in FIG. 6, to provide an opening 78 for receiving the towing tongue 74.

From the foregoing description, the operation of my improved apparatus for supporting farm implements for working and towing will be readily understood. To change the apparatus from the field operation or working position to the road transport or towing position, a lock pin 79 is removed from each of the upstanding brackets 26 whereby the rock shaft may be pivoted from the position shown in FIG. 2 to the position shown in FIG. 3. That is, the lock pin 79 passes through suitable openings provided in the brackets 26 to limit rotation of the rock shaft relative to the wing frame 12. The apparatus is tilted forward by retracting the tongue cylinder 57. The rock shaft 18 is rotated by introducing fluid under pressure into the cylinder 33 whereby the piston rod 32 is retracted to thus move the rock shaft and the wheel units supported thereby to the position shown in FIG. 3. Upon movement of the rock shaft to the position shown in FIG. 3, the lock pins 79 are reinstalled whereby they are now positioned beneath the frame 12, as shown.

The stabilizer frame 66 is then pulled down to the position shown in FIG. 3 and is locked in place by the bolt 71. With the stabilizer frame thus locked in position, the tongue cylinder 57 is extended to lower the apparatus to the position shown in FIG. 4 whereby the wheel 69 engages the ground. The working tongue 53 is disconnected from the tractor 56 and is then raised to the upstanding position by the cylinder 57 to the position shown in FIG. 4. The tongue 53 carries a rearwardly extending bracket 81 which has a suitable opening therethrough for receiving a locking pin 82 whereby the tongue 53 is locked in the upstanding position while the apparatus is being towed. With the tongue in the upright position, all connector members or trunnion locks 47 are moved from the locked position shown in solid lines in FIG. 6 to a downward, unlocked position shown in dotted lines whereby the wheels 44 are free to caster to selected trail positions. The towing tongue 74 is connected to the connector member 47 and the hitch 77 of the towing tongue 74 is then attached to the tractor 56. The tractor is then used to pull the wheels 44 around to a position parallel with the road.

Figure 1:
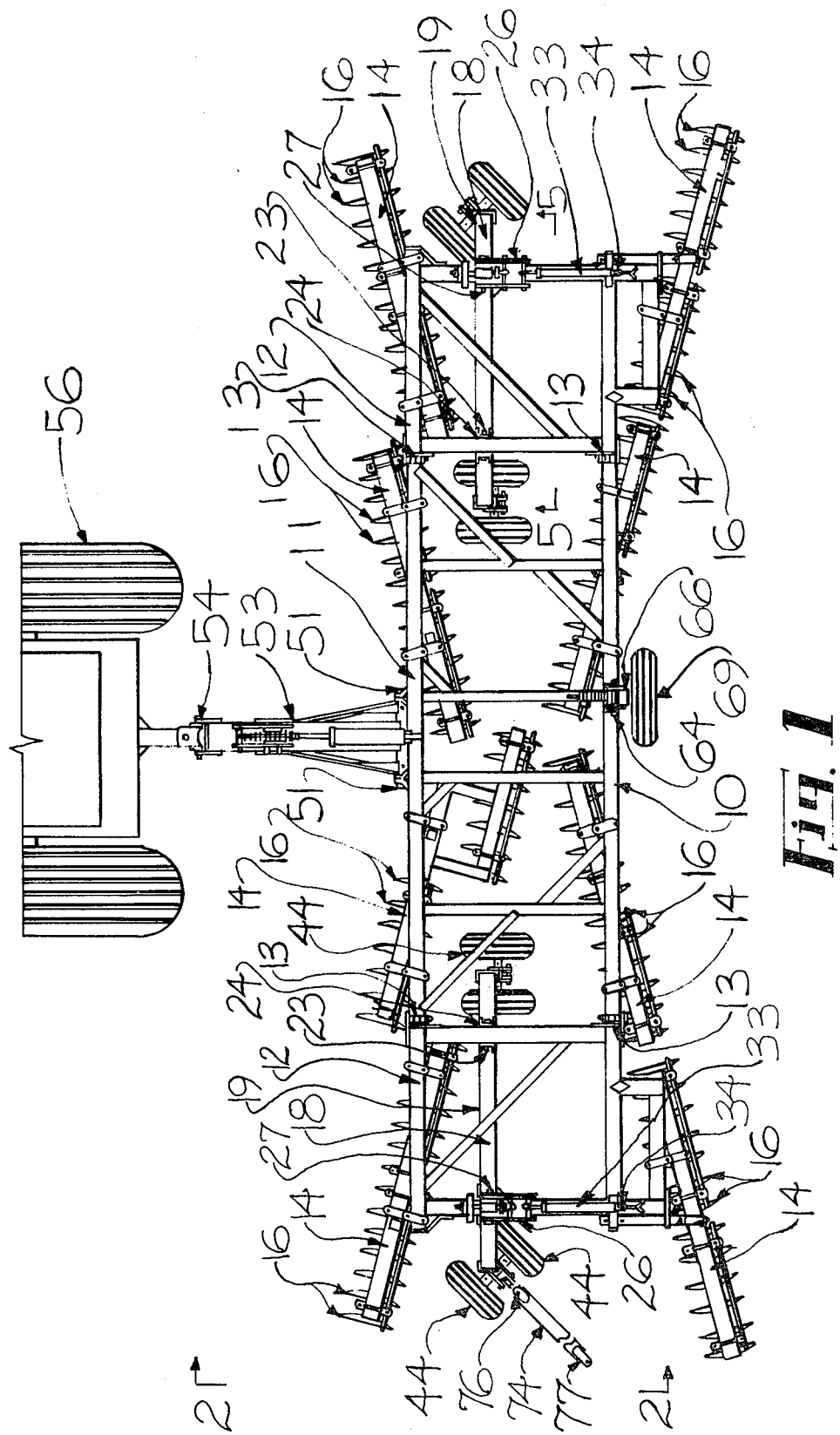
FIG. 1 is a top plan view, partly broken away, showing the working tongue in the horizontal working position and also showing the towing tongue connected to a wheel unit at one end of the supporting frame for steering and towing.

To move the apparatus from the towing position to the working position, the tractor is unhitched from the towing tongue 74 and moved to a position in front of the elongated frame 10, as shown in FIG. 1. The lock member 82 is released and the tongue 53 is lowered by actuating the cylinder 57 to thus move the tongue 53 from the upright position shown in FIG. 4 to the horizontal position shown in FIG. 2. The tongue cylinder 57 is then used to tilt the apparatus forward to the position shown in FIG. 3 whereby the road wheel 69 clears the ground. The bolt 71 is the removed to thus unlock the stabilizer frame 66. The stabilizer frame 66 is then moved to the position shown in FIG. 2. The lock pin 79 is then removed from the brackets 26 to thus unlock the rock shaft 18 whereby it may be pivoted by the cylinder 33. All connector brackets or trunnion locks 47 are now in the unlocked position whereby they are not in engagement with the projection 49. The apparatus is then pulled forward until the wheels 44 caster around to the working position whereby they extend transversely of the elongated frame 10. The cylinders 33 and 57 are then extended, as desired, to raise the wheels 44 whereby the working implements 14 operate at the desired depth. The locking pin 79 is then reinstalled above the frame 12, as shown in FIG. 2. With the apparatus thus adjusted, the trunnion locks or connector brackets 47 are then moved upwardly to the locked position shown in FIG. 6 to limit lateral oscillation of the wheel units.

Depth control using the wheels is set by the depth control stop 59. Since the weight of the apparatus is carried by the stop member 59 and the threaded rod 61 which is connected to the wing frame 12, the depth control setting is positive and repeatable. To allow the working implements 12 to work deeper, the nut 63 is moved outwardly on the threaded rod 61 and the stop member 59 is moved forward. This gives the rock shaft 18 further forward rotation whereby the wheels are raised higher. Reversing the procedure produces a shallower cut in the ground.

From the foregoing it will be seen that I have devised improved apparatus for supporting farm implements for working and towing. By providing an elongated frame which supports farm implements in a working position with the longer dimension of the frame extending transversely of the direction of travel and supports the implements for towing with the longer dimension of the frame extending lengthwise or in the direction of travel, I greatly facilitate the operation of changing the apparatus selectively for working and towing. Also, by eliminating the necessity of having to fold certain sections of the supporting frame upwardly above other sections, I eliminate the overall height of the apparatus as it is being towed. This has been a serious problem in the transferring of such equipment due to the fact that such elevated structures contact power lines and the like. This not only causes damage to the apparatus and the power line or other structure contacted by the apparatus, but often causes injury to the personnel towing the apparatus. Furthermore, my improved apparatus eliminates the necessity of having to split the apparatus into narrow sections for trailing and at the same time the wheels used for supporting the weight of the apparatus during working are also used to support the weight of the apparatus during towing.

While I have shown the elongated frame as being in the form of a main frame pivotally connected to wing frames, it will be apparent to one skilled in the art that the elongated frame could be one integral frame or could comprise two or more pivoted sections connected to each other.

While I have shown my invention in but one form, it will be obvious to those skilled in the art that it is not so limited, but is susceptible of various other changes and modifications without departing from the spirit thereof.

What I claim is:

1. Apparatus for supporting farm implements selectively for working and towing:
   a. an elongated frame disposed to support farm implements in a working position with the longer dimentions of said elongated frame extending transverse to the direction of travel for working,
   b. a working tongue connected to and projecting laterally from a side of said elongated frame for drawing said frame in said direction of travel for working,
   c. at least one elongated rock shaft carried by said elongated frame with said rock shaft extending longitudinally of said elongated frame,
   d. means connecting said rock shaft to said elongated frame for pivotal movement in a vertical plane extending transversely of said elongated frame,
   e. a depending leg member mounted adjacent each end of said rock shaft for lateral pivotal movement relative thereto,
   f. at least one wheel unit carried by each said leg member and adapted for lateral pivotal movement relative thereto about a pivot axis located forwardly of the axis of rotation of a wheel carried by said wheel unit and being movable selectively with said depending leg member to a first position with the pivotal axis of said wheel unit being generally vertical and to a second position with the pivot axis of said wheel unit being in a non-vertical position so that said wheel unit is free to pivot laterally relative to said supporting frame while in said first position and is held against lateral pivotal movement while in said second position whereby said wheel unit supports said elongated frame for movement selectively in said direction of travel for working and in other selected directions including a direction perpendicular to said direction of travel for working with said elongated frame traveling lengthwise,
   g. means retaining said rock shaft at selected pivotal positions relative to said elongated frame do that said elongated frame and the implements carried thereby are supported at selected elevations, and h. means operatively connecting a towing tongue to one end of said elongated frame for towing said frame lengthwise.

2. Apparatus as defined in claim 1 in which said elongated frame comprises:
 a. a centrally disposed main frame, and
 b. a wing frame pivotally connected to each end of said main frame with each said wing frame being pivotally connected to a rock shaft.

3. Apparatus as defined in claim 1 in which said working tongue is pivotally connected to said elongated frame and is movable selectively to a generally horizontal operative position and to an upstanding inoperative position.

4. Apparatus as defined in claim 1 in which each said rock shaft comprises:
 a. an elongated member,
 b. longitudinally spaced brackets carried by said elongated member and pivotally connected to said elongated frame, and
 c. depending, longitudinally spaced support members carried by said elongated member with each said support member being operatively connected to a depending wheel unit.

5. Apparatus as defined in claim 1 in which said means retaining said rock shaft at selected positions comprises a power operated unit interposed between and operatively connected to said rock shaft and said elongated frame.

6. Apparatus as defined in claim 1 in which stabilizer means is carried by said elongated frame in laterally spaced relation to the wheel units and is movable selectively to a ground engaging position and to a position out of engagement with the ground.

7. Apparatus as defined in claim 6 in which said stabilizer means comprises:
 a. a depending stabilizer frame,
 b. means pivotally connecting the upper end of said stabilizer frame to said elongated frame,
 c. a wheel carried by the lower end of said stabilizer frame and movable therewith selectively to said ground engaging position and said position out of engagement with the ground, and
 d. lock means detachably connecting said stabilizer frame to said elongated frame to retain said wheel in said ground engaging position.

8. Apparatus as defined in claim 1 in which said towing tongue is operatively connected to a depending wheel unit carried by the outermost end of a rock shaft.

9. Apparatus for supporting farm implements selectively for working and towing:
 a. en elongated frame disposed to support farm implements in a working position with the longer dimension of said elongated frame extending transverse to the direction of travel for working,
 b. a working tongue connected to and projecting laterally from a side of said elongated frame for drawing said frame in said direction of travel for working,
 c. at least one elongated rock shaft carried by said elongated frame with said rock shaft extending longitudinally of said elongated frame,
 d. means connecting said rock shaft to said elongated frame for pivotal movement in a vertical plane extending transversely of said elongated frame,
 e. a depending shaft-like member mounted adjacent each end of said rock shaft and movable therewith,
 f. a trunnion mounted for rotation on said shaft-like member,
 g. at least one laterally projecting spindle carried by said trunnion and supporting a wheel unit with the center line of said spindle being rearwardly of said shaft-like member so that said wheel unit casters to selected trail positions and supports said elongated frame for movement selectively in said direction of travel for working and in other selected directions including a direction perpendicular to said direction of travel for working with said elongated frame traveling lengthwise,
 h. a releasable lock member interposed between said trunnion and a lateral projection carried by said rock shaft to limit oscillation of said wheel unit,
 i. means retaining said rock shaft at selected pivotal positions relative to said elongated frame so that said elongated frame and the implements carried thereby are supported at selected elevations, and
 j. means operatively connecting a towing tongue to one end of said elongated frame for towing said frame lengthwise.

10. Apparatus as defined in claim 9 in which said means operatively connecting a towing tongue to a wheel unit comprises:
 a. spaced apart, lateral projections carried by said trunnion,
 b. an elongated connector member having one end thereof extending between said lateral projections carried by said trunnion,
 c. there being aligned openings through said lateral projections and said one end of said connector member,
 d. a pin extending through said aligned openings pivotally connecting said connector member to said lateral projections,
 e. there being another opening through said connector member extending generally perpendicular to said aligned openings,
 f. a clevis-like member carried by one end of a towing tongue, and
 g. a clevis pin extending through said clevis-like member and said another opening through said connector member.

11. Apparatus as defined in claim 10 in which the end of said connector member opposite the end thereof connected to said lateral projections is provided with spaced apart extensions disposed to move along opposite sides of a lateral projection carried by said rock shaft to limit lateral oscillation of the wheel unit.

* * * * *